United States Patent Office 3,301,868
Patented Jan. 31, 1967

3,301,868
DISPIRO[CYCLOALKANE-1,2'-OXIRANE-3',3"-INDOLIN]-2"-ONES, AND INTERMEDIATES AND PROCESS THEREFOR
William C. Anthony, Kalamazoo, Mich., assignor to The Upjohn Company, Kalamazoo, Mich., a corporation of Delaware
No Drawing. Filed Oct. 23, 1964, Ser. No. 406,175
11 Claims. (Cl. 260—325)

This application is a continuation-in-part of application Serial No. 345,104, filed February 17, 1964, and now abandoned.

This invention pertains to novel organic compounds and to a novel process for preparing the same. More particularly, the invention is directed to novel dispiro[cycloalkane-1,2'-oxirane-3',3"-indolin]-2"-ones obtained by a novel epoxidation of novel 3-cycloalkylideneoxindole intermediates obtained by condensing a cycloalkanone with an oxindole.

It has now been found in accordance with this invention that 3-cycloalkylideneoxindoles, when treated with hydrogen peroxide in the presence of a basic catalyst, are epoxidized to the novel dispiro[cycloalkane-1,2'-oxirane-3',3"-indolin]-2"-ones of this invention represented by the structural formula:

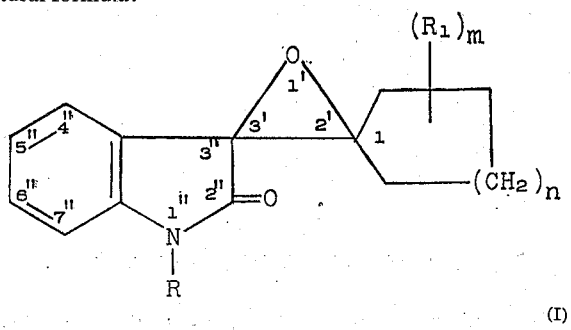

(I)

wherein R is selected from the group consisting of hydrogen and lower-alkyl, $R_1$ is selected from the group consisting of hydrogen and lower-alkyl of from 1 to 4 carbon atoms, inclusive, and $m$ and $n$ are integers from 1 to 4, inclusive, provided, however, that the spirocycloalkane part of the molecule

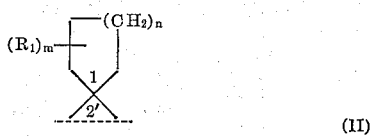

(II)

does not exceed 12 carbon atoms. The term "lower-alkyl" as employed in this description includes, for example, methyl, ethyl, propyl, butyl, hexyl, octyl, and isomeric forms thereof.

The novel dispiro[cycloalkane-1,2'-oxirane-3'-3"-indolin]-2"-ones of this invention (compounds of Formula I) are prepared by epoxidizing a novel 3-cycloalkylideneoxindole (represented in Formula III, infra) with aqueous hydrogen peroxide in the presence of a basic catalyst and an inert reaction medium, advantageously, at a temperature in the range of about 15° C. to about 80° C., preferably in the range of about 20° C. to about 30° C. Illustratively, suitable inert reaction media include alkanols such as methanol (preferred), ethanol, isopropyl alcohol, butanol, and the like. Advantageously, the molar ratio of 3-cycloalkylideneoxindole to hydrogen peroxide can range from about 1:1 to about 1:2.5 or even higher or lower. Preferably, the molar ratio is in the range of about 1:1 to about 1:2. Advantageously, the basic catalyst is an alkali metal hydroxide, such as lithium, sodium, or potassium hydroxide. Likewise, alkali metal carbonates such as sodium carbonate and potassium carbonate, and alkaline earth hydroxides such as barium hydroxide and calcium hydroxide can be used.

The dispiro[cycloalkane-1,2'-oxirane-3',3"-indolin]-2"-ones of the invention are recovered by conventional methods such as neutralization of the base with acid, evaporation of liquid, and recrystallization.

The novel 3-cycloalkylideneoxindole intermediates of this invention can be represented by the following structural formula:

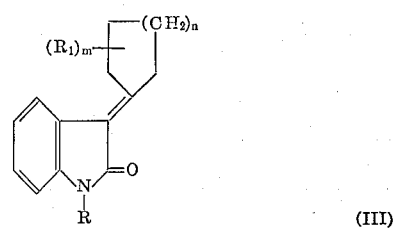

(III)

wherein R, $R_1$, $m$, and $n$ are as defined above. The 3-cycloalkylideneoxindoles of Formula III are prepared by condensing an oxindole of the formula:

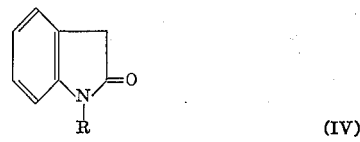

(IV)

wherein R is as defined above, with a cycloalkanone of the formula

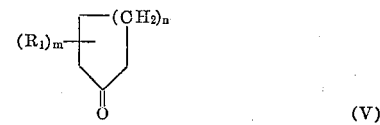

(V)

wherein $R_1$, $m$, and $n$ are as defined above.

The condensation of an oxindole and a cycloalkanone can be effected by known methods, e.g., according to the methods described by Wahl et al., Bull. Soc. Chim. [5] 5, 653–666 (1938) and Windaus et al., Ber. 57, 1876 (1924) for condensing oxindole and certain ketones. In general, the oxindole and cycloalkanone are reacted in the presence of a strongly basic secondary or tertiary amine with an excess of the cycloalkanone as the reaction medium. The reaction mixture is heated at a temperature in the range of about 150° C. to about 250° C. When the cycloalkanone employed in the reaction boils at a temperature lower than about a desired reaction temperature (e.g., cyclopentanone), the heating can be effected in an autoclave. Representative secondary and tertiary amines suitable for catalyzing the reaction include piperidine, N-methylpiperidine, N-methylpiperazine, triethylamine, and the like.

The desired 3-cycloalkylideneoxindole intermediates of Formula III are recovered according to conventional methods, for example, concentrating the mixture, and purifying the product by solvent extraction and crystallization.

Methods for preparing the oxindoles of Formula IV are described by Sumpter, Chem. Rev. 37, 443–479 (1945).

The dispiro[cycloalkane-1,2'-oxirane-3',3"-indolin]-2"-ones of this invention are pharmacologically active. Illustratively, dispiro[cyclohexane-1,2'-oxirane-3',3"-indolin]-2"-one has been found to be active as a sedative, and it is an enzyme inhibitor, for example, it inhibits pseudocholinesterase. The compounds are useful as sedatives in mammals, birds, and other animals.

The following examples are illustrative of the process and products of the present invention, but are not to be construed as limiting.

EXAMPLE 1

*Preparation of dispiro[cyclopentane-1,2'-oxirane-3',3''-indolin]-2''-one*

*Part A: 3-cyclopentylideneoxindole.*—A reaction mixture consisting of 13.3 g. (0.1 mole) of oxindole, 36 g. (0.48 mole) of cyclopentanone, and 1 ml. of piperidine was heated under pressure at 190° C. for 5 hrs. After cooling the reaction mixture to about 25° C., the solids were collected on a filter, washed with ethanol, and recrystallized from 500 ml. of ethanol. There was thus obtained 15.4 g. (77% yield) of 3-cyclopentylideneoxindole having a melting point of 216° to 218° C.

*Analysis.*—Calcd. for $C_{13}H_{13}NO$: C, 78.36; H, 6.57. Found: C, 78.40; H, 6.75.

I.R. NH/OH/unsat. CH: 3160, 3130, 3070, 3020; C=O: 1695; C=C: 1635, 1615, 1590; C—O/C—N: 1225, 1200; ortho sub. phenyl: 745, 735.

All infrared absorbtivities are expressed as reciprocal centimeters. The values were obtained using a mineral oil mull.

U.V. 217 (9060); 251 (26,400); 225 (27,160); 261 (33,480); 293 (7780); sh 303 (6340).

In all the ultraviolet determinations, the first value is the wave length in millimicrons and the second, in parentheses, is the molar absorptivity; "sh" stands for shoulder; and the solvent was ethanol.

3-cyclopentylideneoxindole when administered to female rats prevented conception.

Following the same procedure, but replacing oxindole with 1-methyloxindole, 1-ethyloxindole, 1-propyloxindole, 1-isobutyloxindole, 1-hexyloxindole and 1-octyloxindole, there were prepared 1-methyl-3-cyclopentylideneoxindole, 1-ethyl-3-cyclopentylideneoxindole, 1-propyl-3-cyclopentylideneoxindole, 1-isobutyl-3-cyclopentylideneoxindole, 1-hexyl-3-cyclopentylideneoxindole, and 1-octyl-3-cyclopentylideneoxindole, respectively.

*Part B: Dispiro[cyclopentane-1,2'-oxirane-3',3''-indolin]-2''-one.*—A 5.0 g. (0.025 mole) sample of 3-cyclopentylideneoxindole (prepared in Part A, above) was dissolved in 500 ml. of refluxing methanol. After cooling the solution to about 30° to 35° C., it was made alkaline with 6.2 ml. (0.025 mole) of 4 N aqueous sodium hydroxide solution before adding 3.9 ml. (0.039 mole) of 30% aqueous hydrogen peroxide. The reaction mixture was then kept at 25° C. for 4 days. Two ml. of glacial acetic acid was added, and the solvent was evaporated under reduced pressure. The solid thus obtained was recrystallized from 300 ml. of 70% ethanol to give 4.7 g. (87% yield) of dispiro[cyclopentane-1,2'-oxirane-3',3''-indolin]-2''-one having a melting point of 203° to 204° C.

*Analysis.*—Calcd. for $C_{13}H_{13}NO_2$: C, 72.54; H, 6.08; N, 6.50. Found: C, 72.56; H, 6.45; N, 6.19.

I.R. NH: 3190; C=O: 1725, 1710, 1685; C=C: 1625, 1605; C—O/C—N: 1230, 1195, 1160, 1100; ortho sub. phenyl: 765.

U.V. 219 (28,500); 251 (4675); sh 260 (3880); sh 270 (2305).

Following the same procedure but replacing 3-cyclopentylideneoxindole with 1-methyl-3-cyclopentylideneoxindole, 1-ethyl-3-cyclopentylideneoxindole, 1-propyl-3-cyclopentylideneoxindole, 1-isobutyl-3-cyclopentylideneoxindole, 1-hexyl-3-cyclopentylideneoxindole, and 1-octyl-3-cyclopentylideneoxindole, there were prepared 1''-methyldispiro[cyclopentane-1,2'-oxirane-3',3''-indolin]-2''-one, 1''-ethyldispiro[cyclopentane-1,2'-oxirane-3',3''-indolin]-2''-one, 1''-propyldispiro[cyclopentane-1,2'-oxirane-3',3''-indolin]-2''-one, 1''-isobutyldispiro[cyclopentane-1,2'-oxirane-3',3''-indolin]-2''-one, 1''-hexyldispiro[cyclopentane-1,2'-oxirane-3',3''-indolin]-2''-one, and 1''-octyldispiro[cyclopentane-1,2'-oxirane-3',3''-indolin]-2''-one, respectively.

EXAMPLE 2

*Preparation of dispiro[cyclohexane-1,2'-oxirane-3',3''-indolin]-2''-one*

*Part A: 3-cyclohexylideneoxindole.*—A reaction mixture consisting of 19.6 g. (0.15 mole) of oxindole, 50 ml. of cyclohexanone, and 1 ml. of piperidine was heated at 165° to 170° C. for 17 hrs. After cooling the reaction mixture to about 25° C., the solids were collected on a filter, washed with ether, and recrystallized from about 200 ml. ethanol. There was thus obtained 18.0 g. (56% yield) of 3-cyclohexylideneoxindole having a melting point of 197° to 198° C.

*Analysis.*—Calcd. for $C_{14}H_{15}NO$: C, 78.84; H, 7.09; N, 6.57. Found: C, 79.19; H, 7.21; N, 6.66.

I.R. NH: 3160; unsat. CH: 3080; C=O: 1685; C=C: 1610, 1580; C—H: 1217; ortho sub. phenyl: 789, 745.

U.V. 218 (9550); 255 (26,800); 262 (51,100); 293 (7800); 349 (1950).

*Part B: Dispiro[cyclohexane-1,2'-oxirane-3',3''-indolin]-2''-one.*—A 6.4 g. (0.03 mole) sample of 3-cyclohexylideneoxindole (prepared in Part A, above) was dissolved in 500 ml. methanol. This solution was made alkaline with 1.2 g. (0.03 mole) sodium hydroxide and 25 ml. water before adding 3.0 ml. of 30% aqueous hydrogen peroxide (0.03 mole). The reaction mixture was kept at 25° C. for 3 days. Two ml. glacial acetic acid was added, and the solvent was evaporated under reduced pressure. The solid thus obtained was recrystallized two times from 50% aqueous methanol to give 6.8 g. (100% yield) of dispiro[cyclohexane-1,2'-oxirane-3',3''-indolin]-2''-one having a melting point of 168° to 169.5° C.

*Analysis.*—Calcd. for $C_{14}H_{15}NO_2$: C, 73.34; H, 6.59; N, 6.11. Found C, 72.99; H, 6.64; N, 6.30.

I.R. NH: 3180; unsat. CH: 3040; C=O: 1725, 1690; C=C: 1625, 1600, 1487; C—N: 1215, 1125; ortho sub. phenyl: 780, 740, 705.

U.V. 218 (27,950); 246 (5300); sl sh 270 (2400); 302 (1450).

EXAMPLE 3

*Preparation of dispiro[cycloheptane-1,2'-oxirane-3',3''-indolin]-2''-one*

*Part A: 3-cycloheptylideneoxindole.*—A mixture consisting of 13.2 g. (0.1 mole) of oxindole, 36 g. (0.32 mole) of cycloheptanone, and 1 ml. of piperidine was heated under pressure at 190° C. for 5 hrs. After allowing the reaction mixture to cool to about 25° C., the solids were recovered on a filter, washed with ethanol, and then recrystallized from about 200 ml. of ethanol. There was thus obtained 4.6 g. of 3-cycloheptylideneoxindole as a hemihydrate having a melting point of 159° to 160° C.

*Analysis.*—Calcd. for $C_{15}H_{17}NO \cdot 1/2H_2O$: C, 76.23; H, 7.68. Found: C, 76.83; H, 7.19.

I.R. NH/OH/unsat. CH: 3150, 3120, 3080, 3030; C=O: 1685; C=C: 1620, 1605, 1585; C—O/C—N: 1230, 1175; ortho sub. phenyl: 745, 730.

U.V. 217 (9000); sh 226 (7370); 254 (26,700); 262 (33,920); 295 (8060); sh 306 (6230).

*Part B: Dispiro[cycloheptane-1,2'-oxirane-3',3''-indolin]-2''-one.*—Following the procedure of Example 1, Part B, but replacing 3-cyclopentylideneoxindole with 3-cycloheptylideneoxindole hemihydrate (prepared in Part A, above) there was obtained a 95% yield of dispiro[cycloheptane-1,2'-oxirane-3',3''-indolin]-2''-one having a melting point of 173° to 174° C.

*Analysis.*—Calcd. for $C_{15}H_{17}NO_2$: C, 74.04; H, 7.04; N, 5.76. Found: C, 73.90; H, 7.09; N, 5.78.

I.R. NH/unsat. CH: 3180, 3140, 3070; C=O: 1715; C=C: 1620, 1600; C—O/C—N: 1230, 1200; ortho sub. phenyl: 765.

U.V. 219 (27,700); 248 (5100); 270 (2355).

EXAMPLE 4

Following the procedure of Example 1, Part A, but replacing cyclopentanone with 3-ethylcyclopentanone, 2,5 - diethylcyclopentanone, 3 - ethyl - 2 - methylcyclopentanone, 3,3,4 - trimethylcyclopentanone, 2,3,3,4 - tetramethylcyclopentanone, 2,5 - dimethylcyclohexanone, 4-methylcyclohexanone, 2,4-diethyl-5-methylcyclohexanone, 3 - isobutylcyclohexanone, 3,3,5,5 - tetramethylcyclohexanone 3-ethyl-5-methylcyclohexanone, 4-tert-butylcyclohexanone, 3-isopropyl-3,5,5-trimethylcyclohexanone, 3,3-dimethylcycloheptanone, 5-ethyl-3-methylcycloheptanone, 2,3,7 - trimethylcycloheptanone, 3,3 - dimethylcyclooctanone, and 3-methylcyclooctanone, there were prepared 3-(3-ethylcyclopentylidene)-oxindole, 3-(2,5-diethylcyclopentylidene)oxindole, 3 - (3 - ethyl - 2 - methylcyclopentylidene)oxindole, 3 - (3,3,4 - trimethylcyclopentylidene)-oxindole, 3-(2,3,3,4-tetramethylcyclopentylidene)oxindole, 3-(2,5-dimethylcyclohexylidene)oxindole, 3-(4-methylcyclohexylidene)oxindole, 3 - (2,4 - diethyl - 5 - methylcyclohexylidene)oxindole, 3 - (3 - isobutylcyclohexylidene)-oxindole, 3-(3,3,5,5-tetramethylcyclohexylidene)oxindole, 3 - (3-ethyl-5-methylcyclohexylidene)oxindole, 3 - (4-tert-butylcyclohexylidene)oxindole, 3 - (3 - isopropyl - 3,5,5-trimethylcyclohexylidene)oxindole, 3-(3,3-dimethylcycloheptylidene)oxindole, 3 - (5 - ethyl - 3 - methylcycloheptylidene)oxindole, 3-(2,3,7 - trimethylcycloheptylidene)-oxindole, 3-(3,3-dimethylcyclooctylidene)oxindole, and 3-(3-methylcyclooctylidene)oxindole, respectively.

EXAMPLE 5

Following the procedure of Example 1, Part B, but replacing 3-cyclopentylideneoxindole with 3-(3-ethylcyclopentylidene)-oxindole, 3-(2,5-diethylcyclopentylidene)oxindole,
3-(3-ethyl-2-methylcyclopentylidene)oxindole,
3-(3,3,4-trimethylcyclopentylidene)oxindole,
3-(2,3,3,4-tetramethylcyclopentylidene)oxindole,
3-(2,5-dimethylcyclohexylidene)oxindole,
3-(4-methylcyclohexylidene)oxindole,
3-(2,4-diethyl-5-methylcyclohexylidene)oxindole,
3-(3-isobutylcyclohexylidene)oxindole,
3-(3,3,5,5-tetramethylcyclohexylidene)oxindole,
3-(3-ethyl-5-methylcyclohexylidene)oxindole,
3-(4-tert-butylcyclohexylidene)oxindole,
3-(3-isopropyl-3,5,5-trimethylcyclohexylidene)oxindole,
3-(3,3-dimethylcycloheptylidene)oxindole,
3-(5-ethyl-3-methylcycloheptylidene)oxindole,
3-(2,3,7-trimethylcycloheptylidene)oxindole,
3-(3,3-dimethylcyclooctylidene)oxindole,
and 3-(3-methylcyclooctylidene)oxindole,
there were prepared 3-ethyl-dispiro[cyclopentane-1,2'-oxirane-3',3''-indolin]-2''-one,
2,5-diethyldispiro[cyclopentane-1,2'-oxirane-3',3''-indolin]-2''-one,
3-ethyl-2-methyldispiro[cyclopentane-1,2'-oxirane-3',3''-indolin]2''-one,
3,3,4-trimethyldispiro[cyclopentane-1,2'-oxirane-3',3''-indolin[-2''-one,
2,3,3,4-tetramethyldispiro[cyclopentane-1,2'-oxirane-3',3''-indolin]-2''-one,
2,5-dimethyldispiro[cyclohexane-1,2'-oxirane-3',3''-indolin]-2''-one,
4-methyldispiro[cyclohexane-1,2'-oxirane-3',3''-indolin]-2''-one,
2,4-diethyl-5-methyldispiro[cyclohexane-1,2'-oxirane-3',3''-indolin]-2''-one,
3-isobutyldispiro[cyclohexane-1,2'-oxirane-3',3''-indolin]-2''-one,
3,3,5,5-tetramethyldispiro[cyclohexane-1,2'-oxirane-3',3''-indolin]-2''-one,
3-ethyl-5-methyldispiro[cyclohexane-1,2'-oxirane-3',3''-indolin]-2''-one,
4-tert-butyldispiro[cyclohexane-1,2'-oxirane-3',3''-indolin]-2''-one,
3-isopropyl-3,5,5-trimethyldispiro[cyclohexane-1,2'-oxirane-3',3''-indolin]-2''-one,
3,3-dimethyldispiro[cycloheptane-1,2'-oxirane-3',3''-indolin]-2''-one,
5-ethyl-3-methyldispiro[cycloheptane-1,2'-oxirane-3',3''-indolin]-2''-one,
2,3,7-trimethyldispiro[cycloheptane-1,2'-oxirane-3',3''-indolin]-2''-one,
3,3-dimethyldispiro[cyclooctane-1,2'-oxirane-3',3''-indolin]-2''-one,
and 3-methyldispiro[cyclooctane-1,2'-oxirane-3',3''-indolin]-2''-one,
respectively.

I claim:
1. Dispiro[cycloalkane - 1,2' - oxirane - 3',3''-indolin]-2''-one of the formula:

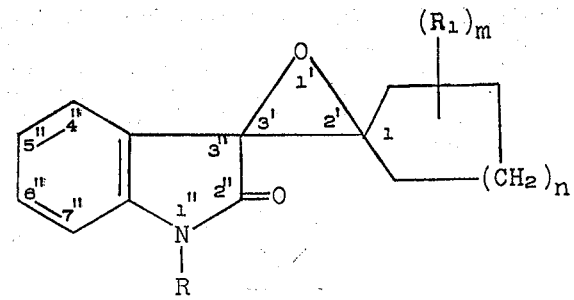

wherein R is selected from the group consisting of hydrogen and lower-alkyl; $R_1$ is selected from the group consisting of hydrogen and lower-alkyl of from 1 to 4 carbon atoms, inclusive, and $m$ and $n$ are integers from 1 to 4, inclusive, provided, however, that the spirocycloalkane part of the molecule

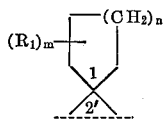

does not exceed 12 carbon atoms.

2. Dispiro[cyclopentane - 1,2' - oxirane - 3',3'' - indolin]-2''-one.
3. Dispiro[cyclohexane - 1,2' - oxirane - 3',3'' - indolin]-2''-one.
4. Dispiro[cycloheptane - 1,2' - oxirane - 3',3'' - indolin]-2''-one.
5. 3-cycloalkylideneoxindole of the formula:

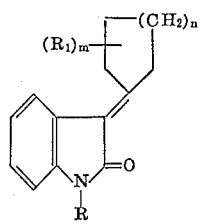

wherein R is selected from the group consisting of hydrogen and lower-alkyl, $R_1$ is selected from the group consisting of hydrogen and lower-alkyl of from 1 to 4 carbon atoms, inclusive, and $m$ and $n$ are integers from 1 to 4, inclusive, provided, however, that the cycloalkylidene group

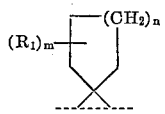

does not exceed 12 carbon atoms.
6. 3-cyclopentylideneoxindole.
7. 3-cyclohexylideneoxindole.
8. 3-cycloheptylideneoxindole.

9. The process for preparing dispiro[cycloalkane-1,2'-oxirane-3',3''-indolin]-2''-one of the formula:

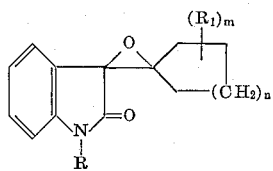

wherein R is selected from the group consisting of hydrogen and lower-alkyl, $R_1$ is selected from the group consisting of hydrogen and lower-alkyl of from 1 to 4 carbon atoms, inclusive and $m$ and $n$ are integers from 1 to 4, inclusive, provided however, that the spirocycloalkane part of the molecule

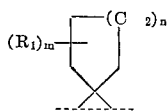

does not exceed 12 carbon atoms, which comprises epoxidizing a 3-cycloalkylideneoxindole of the formula:

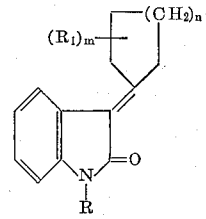

wherein R, $R_1$, $m$, and $n$ are as defined above, with aqueous hydrogen peroxide and a basic catalyst.

10. The process according to claim 9 wherein the basic catalyst is an alkali metal hydroxide, and the reaction is carried out in the presence of an alkanol at a temperature in the range of about 15° C. to about 80° C.

11. The process according to claim 10 wherein the alkali metal hydroxide is sodium hydroxide, the alkanol is methanol, and the reaction temperature is about 25° C.

No references cited.

ALEX MAZEL, *Primary Examiner.*

M. O'BRIEN, *Assistant Examiner.*